United States Patent Office 3,146,241
Patented Aug. 25, 1964

3,146,241
STABILIZATION OF 6,7,8,9,10,10 - HEXACHLORO-1,5,5a,6,9,9a-HEXAHYDRO - 6,9 - METHANO-2,4,3-BENZODIOXATHIEPIN-3-OXIDE
Harry Dreifus, Niagara Falls, N.Y., assignor to Hooker Chemical Corporation, Niagara Falls, N.Y., a corporation of New York
No Drawing. Filed Apr. 11, 1961, Ser. No. 102,128
2 Claims. (Cl. 260—327)

This invention relates to a process for stabilizing 6,7,8,9,10,10 -hexachloro-1,5,5a,6,9,9a-hexahydro-6,9-methano-2,4,3-benzodioxathiepin-3-oxide, and to the new and stable compositions which are produced thereby.

For purposes of brevity, the term "thiepin-3-oxide" is used throughout the description to indicate the compound 6,7,8,9,10,10 - hexachloro - 1,5,5a,6,9,9a - hexahydro-6,9-methano-2,4,3-benzodioxathiepin-3-oxide.

The thiepin-3-oxide may be represented structurally as follows:

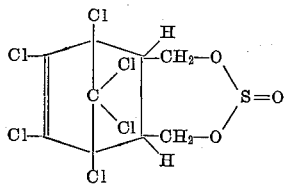

This compound finds utility as a herbicide, fungicide, insecticide, disinfectant, and may also be used for protecting wood, paper, textiles and leather.

The thiepin-3-oxide differs markedly from other chlorinated Diels-Alder type compounds in that it contains a sulfite ring, which presents a unique stabilization problem. In its usual commercial form, the thiepin-3-oxide is a solid which is susceptible to decomposition under normal storage conditions. The rate of decomposition varies from an insignificant degree to several percent per week. One of the decomposition products is 1,4,5,6,7,7-hexachloro-2,3-bis(hydroxymethyl) - bicyclo - (2.2.1)-heptene-5, also known as 1,4,5,6,7,7 - hexachlorobicyclo - (2.2.1)-hept-5-ene - 2,3-dimethanol. Other decomposition products include sulfur dioxide and hydrogen chloride. These decomposition products have little, if any, pesticidal activity of the type exhibited by the thiepin-3-oxide. Not only does the decomposition decrease the effectiveness of the thiepin-3-oxide as an insecticide and the like, but also the standard fiber drums normally employed in the shipment of the thiepin-3-oxide in its usual commercial form, are rapidly corroded and weakened by the decomposition products.

United States patent application Serial Number 800,912, filed March 23, 1959, by Richard H. Kimball et al., now Patent 3,105,081, discloses a process for stabilizing thiepin-3-oxide with steam. United States Patent application Serial Number 800,951, filed March 23, 1959, by Emil Geering, now Patent 3,078,277, discloses a process for stabilizing thiepin-3-oxide with a nitrogen compound containing the radical

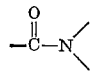

These processes have been effective in stabilizing thiepin-3-oxide against decomposition during storage. However, for some reason which is apparently unexplainable at this time, occasionally there is significant decomposition of the thiepin-3-oxide when it is contacted with steam. For this reason, a significant portion of the thiepin-3-oxide product fails to meet purity specifications.

An object of this invention is to provide a method of preventing decomposition of 6,7,8,9,10,10-hexachloro-1,5,5a,6,9,9a-hexahydro - 6,9 - methano-2,4,3-benzodioxathiepin-3-oxide when contacted with steam.

It is another object of this invention to provide a stable 6,7,8,9,10,10 - hexachloro - 1,5,5a,6,9,9a - hexahydro-6,9-methano-2,4,3-benzodioxathiepin-3-oxide composition.

A further object of the invention is to provide an improved method of preventing the decomposition of 6,7,8,9,10,10 - hexachloro - 1,5,5a,6,9,9a - hexahydro-6,9-methano-2,4,3-benzodioxathiepin-3-oxide under storage conditions.

These and other objects of the invention will be apparent from the following detailed description thereof.

It has now been discovered that 6,7,8,9,10,10-hexachloro-1,5,5a,6,9,9a-hexahydro - 6,9-methano-2,4,3-benzodioxathiepin-3-oxide can be stabilized against decomposition by contacting the thiepin-3-oxide in molten form with a stabilizing proportion of a phytate compound containing the resulting mixture with steam, and then separating the thiepin-3-oxide in stabilized form from any remaining water.

The thiepin-3-oxide, in molten form, prepared by any conventional technique may be stabilized in accordance with the technique of the instant invention. For example, the thiepin-3-oxide prepared in accordance with the technique of U.S. patent application Serial Number 733,500, filed May 7, 1958, now Patent 2,983,732, may be stabilized in accordance with the technique of this invention. In the latter patent application a process is disclosed in which an unsaturated dihydric alcohol such as cis-2-butene diol-1,4 is slowly added to a stoichiometric excess of a hexahalocyclopentadiene such as hexachlorocyclopentadiene, in the presence of a compound selected from the group consisting of alkali metal carbonates, alkaline earth metal carbonates, epoxides, and mixtures thereof, and in the presence of a suitable solvent. The Diels-Alder adduct thus obtained is then reacted with thionyl chloride to yield the thiepin-3-oxide.

The thiepin-3-oxide, while still in a molten form, or solid thiepin-3-oxide which has been melted, as the case may be, is contacted with a stabilizing proportion of a phytate compound such as calcium phytate, phytic acid or any other phytate compound capable of stabilizing the thiepin-3-oxide. The phytate compound is added in a proportion between about 0.05 and about 0.5 percent, and preferably between about 0.1 and about 0.2 percent by weight of the thiepin-3-oxide. Greater or lesser proportions may be employed if desired. However, when the proportion of the phytate compound is less than about 0.1 percent by weight of the thiepin-3-oxide, a satisfactory degree of stabilization is not always obtained. Stabilization of the thiepin-3-oxide can be obtained when a proportion of the phytate compound greater than about 0.5 percent by weight is employed, but the purity of the thiepin-3-oxide is gradually reduced as the concentration of the phytate compound is increased, and therefore, the use of excessive proportions of the phytate compound should be avoided.

The phytate compound and the thiepin-3-oxide are admixed to yield a substantially uniform mixture, and steam is then contacted with the resulting mixture in a proportion equivalent to at least about five percent by weight of the thiepin-3-oxide, and preferably between about two hundred and about six hundred percent by weight of the thiepin-3-oxide. Greater proportions of steam may be used if desired. The steam is preferably superheated to minimize the proportion of water retained in the thiepin-3-oxide. Any temperature may be employed during steaming that will retain the thiepin-3-oxide in molten form without decomposition and which will minimize condensation of steam in the thiepin-3-oxide. Temperatures between about fifty and about one hundred and seventy degrees centigrade may be employed. In a preferred embodiment of the invention the uniform mixture of calcium phytate and the thiepin-3-oxide in molten form is maintained at a temperature between about one hundred and about one hundred and ten degrees centigrade while passing clean superheated steam through the mixture with agitation, the steam rate being sufficient to maintain an absolute pressure as low as about two hundred millimeters of mercury for a period of about three hours. After this period the flow of steam is discontinued, and air, with agitation is passed through the molten material to remove substantially all of the water retained therein. Generally, sufficient drying can be obtained by passing air through the molten material for a period of about three hours.

After drying, if desired, the molten material may be admixed with a stabilizing proportion of a nitrogen-containing compound containing the radial

Typical examples of suitable compounds containing the radical

include amides having the formula:

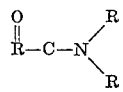

wherein each R is selected from the group consisting of hydrogen, alkyl, cycloalkyl, aryl, alkaryl and mixtures thereof. Examples of amides include formamide, acetamide, caproamide, capramide, acrylamide, oleamide, N-methylformamide, N-cyclohexylcapramide, acetanile, stear-p-toluide, phenylacetanilide, N,N-dihpenylacetamide, and the like.

Ureas may also be employed having the formula:

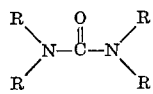

wherein each R is defined as above. Examples of ureas include urea, methylurea, sym-diallylurea, tetrabenzylurea, tetra-p-tolyurea, N,N'-di-p-tolyl-N,N'-dibenzylurea, cyclohexylurea, phenylurea, n-octadecylurea and the like.

Polyamides may also be employed having the formula:

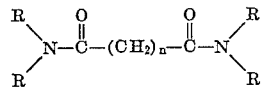

wherein each R is defined as above and $n$ is an integer from 0–8. Examples of polyamides include oxamide, succinamide, malonanilide, N,N'-dimethyloxamide, adipamide, malonamide, ethylmalonamide, α,α-dimethylpimelamide, decandicarboxamide, and the like.

Additionally, other compounds containing the radical

may be employed such as imides, for example, succinimide, glutarimide, maleimide, 1,2-cyclyhexanecarboximide, etc.; secondary and tertiary amides, for example, diacetamide, triacetamide, dipropionamide, etc.; barbituric acid and barbituric acid derivatives, for example, 1,3-diethylbarbituric acid, 5-phenylbarbituric acid, 5,5-diethylbarbituric acid; etc.; isocyanuric acid, trimethylisocyanuric ester; parabanic acid; hydantoin, uracil; urazole, 2,5-diketopiperazine; acetylurea; diacetylurea; etc.

The preferred compounds for this purpose are the amides and ureas, and in particular urea, formamide, acrylamide and acetanilide. Generally, between about 0.01 and about fifteen percent by weight of the compound containing the radical

based on the weight of the thiepin-3-oxide, is sufficient to provide adequate stabilization.

The stabilized thiepin-3-oxide in molten form is then solidified by conventional techniques, such as by flaking, casting and the like.

The thiepin-3-oxide stabilized in this manner may be stored for extended periods without significant degradation.

The following example is presented to define the invention more fully without any intention of being limited thereby. All parts and percentages are by weight unless otherwise specified.

*Example*

Thionyl chloride was reacted with 1,4,5,6,7,7-hexachloro-2,3-bis(hydroxymethyl)bicyclo-(2.2.1)heptene-5 to yield the thiepin-3-oxide, 6,7,8,9,10,10-hexachloro-1,5,5a,-6,9,9a - hexahydro - 6,9 - methano - 2,4,3 - benzodioxathiepin-3-oxide. Two portions of one hundred grams each of the thiepin-3-oxide were collected. One portion was placed in a five hundred milliliter, three-necked flask, provided with an agitator, a steam inlet and a vapor outlet. Calcium phytate (0.2 gram), was added to the flask and the resulting mixture was heated with agitation to effect melting of the thiepin-3-oxide. The molten material was maintained at a temperature of one hundred degrees centigrade at a pressure of one hundred and forty milliliters of mercury, while bubbling superheated steam through the molten material for three hours. Vapors discharged from the flask were condensed and collected, and yielded two hundred and sixty cc. of water during the three hour period. After steaming was discontinued, air was bubbled through the molten mixture for fifteen minutes to remove traces of condensed water. Formamide (one gram) was admixed with the dry molten material and the resulting mixture was then solidified by cooling at room temperature. Solidification required sixteen minutes. The stabilized product assayed ninety-one percent thiepin-3-oxide, and contained 0.22 percent xylene insolubles.

For purposes of comparison, the other one hundred gram portion of the thiepin-3-oxide was treated in a similar manner, with steam, air and formamide, but no calcium phytate was added. Thirty-nine minutes were required to effect solidification. The resulting product assayed 88.4 percent thiepin-3-oxide, and contained ten percent xylene insolubles.

This comparative test showed that when calcium phytate was employed, decomposition was negligible as determined by the proportion of xylene insolubles, but when no calcium phytate was employed, there was significant decomposition as evidenced by the large proportion of xylene insolubles.

It will be recognized by those skilled in the art that various modifications within the scope of the invention are possible without departing from the spirit and scope of the invention. Therefore, I do not wish to be limited except by the appended claims.

I claim:
1. A stabilizing process which comprises admixing molten 6,7,8,9,10,10-hexachloro-1,5,5a,6,9,9,a-hexahydro-6,9-methano-2,4,3-benzodioxathiepin-3-oxide with calcium phytate to yield a substantially uniform mixture, contacting said mixture with steam, in an amount of at least 5% by weight of said oxide so as to effect further stabilization and, separating water from the resulting stabilized product.
2. The process of claim 1 wherein the proportion of said calcium phytate is between about 0.05 and about 0.5 percent by weight of said oxide.

References Cited in the file of this patent

UNITED STATES PATENTS 2,443,835     Pedersen _____ June 22, 1948

OTHER REFERENCES

Poggi et al.: Rev. Asoc. Bioquim. Argentia, vol. 14, No. 68, pp 9–12 (1949), abstracted Chem. Abstracts, vol. 44, p. 6497c (1950).

UNITED STATES PATENT OFFICE
CERTIFICATE OF CORRECTION

Patent No. 3,146,241                                        August 25, 1964

Harry Dreifus

It is hereby certified that error appears in the above numbered patent requiring correction and that the said Letters Patent should read as corrected below.

Column 1, line 50, for "democposition" read -- decomposition --; column 5, line 5, after "phytate" insert -- , in an amount of at least 0.05% by weight of said oxide --.

Signed and sealed this 26th day of January 1965.

(SEAL)
Attest:

ERNEST W. SWIDER                                  EDWARD J. BRENNER
Attesting Officer                                        Commissioner of Patents